United States Patent

[11] 3,585,268

[72] Inventors Joseph R. Monks;
Henry E. Roll; Robert R. Rough, all of Toledo, Ohio
[21] Appl. No. 695,616
[22] Filed Jan. 4, 1968
[45] Patented June 15, 1971
[73] Assignee Owens-Illinois, Inc.

[54] METAL-LINED GLASS MELTER
3 Claims, 2 Drawing Figs.

[52] U.S. Cl. ..................................................... 13/6,
65/335, 65/347, 65/356, 65/374
[51] Int. Cl. ....................................................... C03b 3/00
[50] Field of Search .......................................... 65/135,
335, 347, 374, 355, 356; 13/6

[56] References Cited
UNITED STATES PATENTS

| | | | |
|---|---|---|---|
| 2,122,469 | 7/1938 | Hitner | 65/347 X |
| 3,404,210 | 10/1968 | Weber | 13/6 X |
| 3,498,779 | 3/1970 | Hathaway | 65/135 X |
| 3,206,295 | 9/1965 | Mattern | 13/6 X |

OTHER REFERENCES
Procedures in Experimental Physics, J. Strong, 1944, Prentice-Hall, Inc., p. 516— 521.

Primary Examiner—S. Leon Bashore
Assistant Examiner—J. B. Hardaway
Attorneys—D. T. Innis and W. A. Schaich ABSTRACT: In the melting of glass, particularly of glasses which are of the low melting point variety in the range of 1,600° F., the melters conventionally used have been rather massive units. A metal-lined melter of lightweight construction is disclosed herein. The melter is compact, highly mobile, in the sense that it may be moved from one location to another location, and has great utility in the production of molten colorant additive for direct addition to a large capacity glass forehearth. The melter is constructed of one-eighth inch thick "Hastelloy X" alloy. A plurality of Kanthal heating elements are mounted in a ceramic muffle in substantially surrounding relationship with respect to the metal melter. An insulating, outer covering over this area is provided by two layers of firebrick. The entire unit is covered with a Transite material and totally supported by an angle iron frame s as to render the melting unit portable.

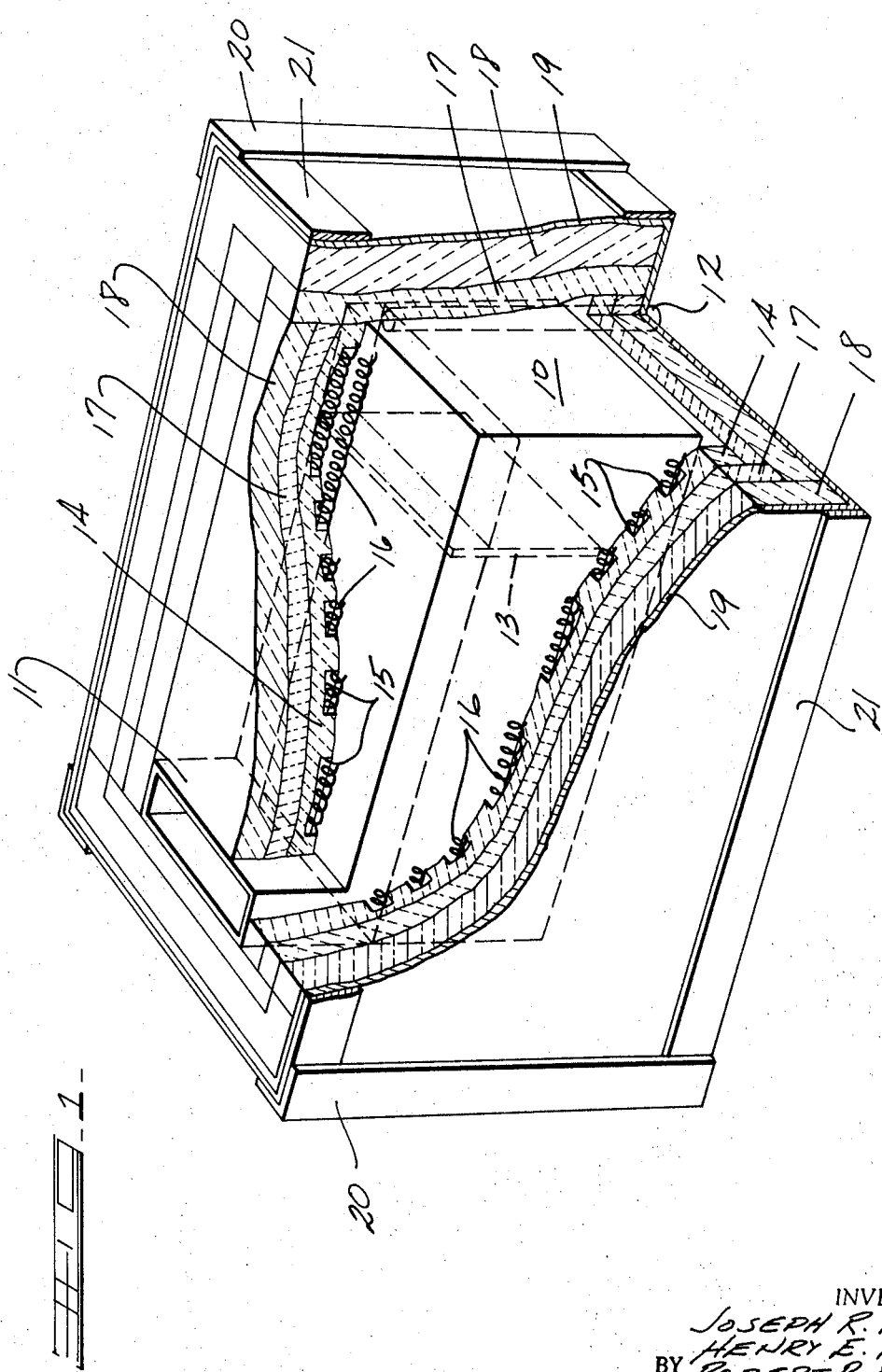

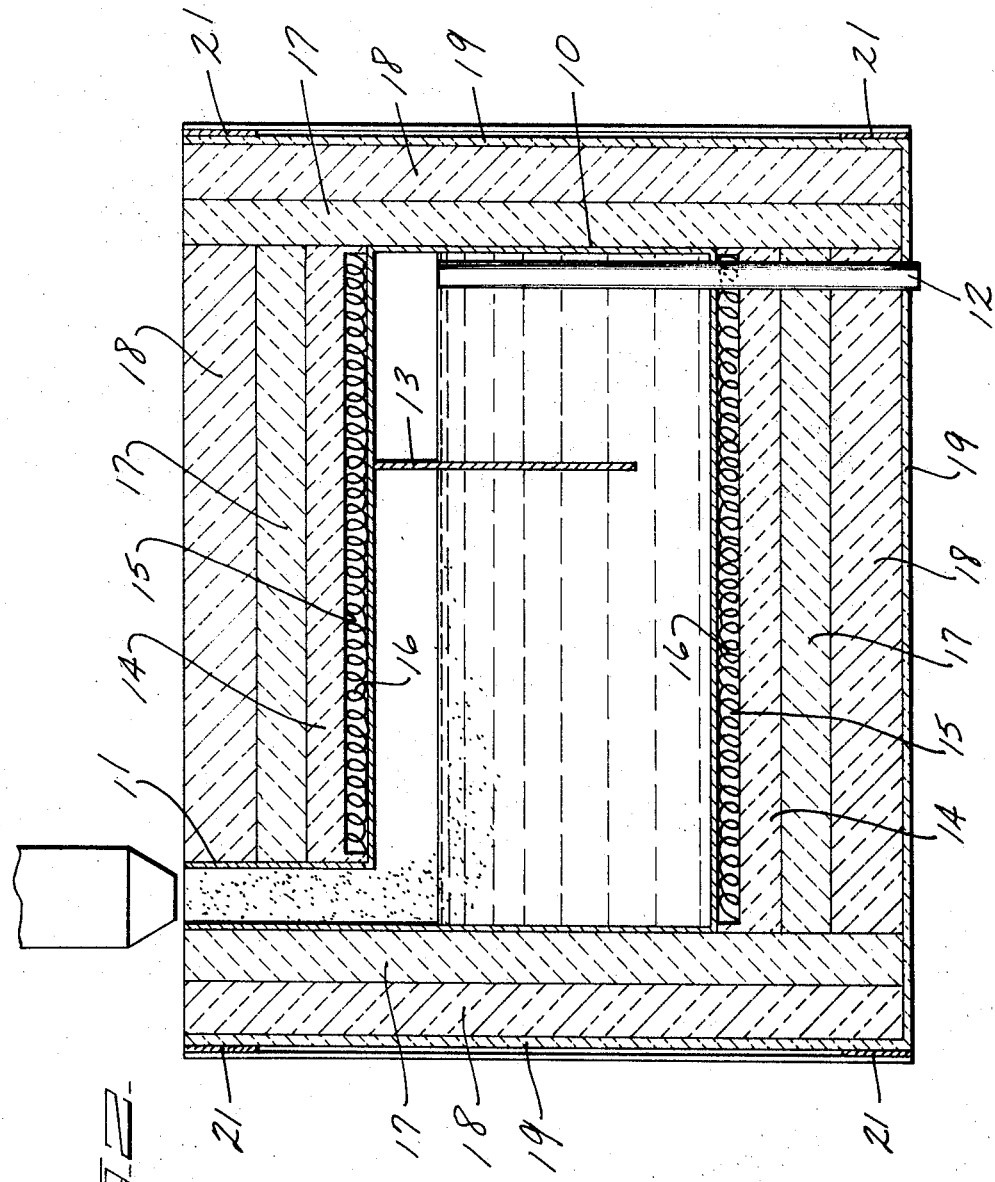

METAL-LINED GLASS MELTER

BACKGROUND OF THE INVENTION

This invention is directed to the problem of providing a compact, unitary melter for low melting glasses with the desirable attribute that the unit be portable to the extent that it may be moved into cramped positions relative to forehearth structures presently existing in glass plants. It is desirable to have a melter which is rugged enough so that it may be moved about without danger of cracking or leaks appearing in the structure, yet being insulated sufficiently so as to be economically feasible to melt glass batch thoroughly by electric-resistance heaters.

DESCRIPTION OF PRIOR ART

It has been the practice in the past to construct the melters for supplying molten addition to forehearths in positions where they are to be utilized with the small melting units being incapable of being moved to different locations. Primarily, the lack of portability is due to the fact that the units have been totally constructed of what are considered to be conventional firebrick construction. When these melters have been in use they invariably result in cracking of the firebrick so as to require extensive repair or relining or in some instances they become so badly misaligned that it is not feasible to even try to move them.

SUMMARY

This invention is directed to a portable glass melting unit wherein the glass contacting surfaces are formed entirely of metal and the unit is heated by electrical-resistance heaters positioned adjacent the external surfaces of the metal and surrounded by suitable insulating firebrick.

DESCRIPTION OF THE DRAWINGS

FIG. 1 is a perspective view with parts broken away of the melter of the invention; and FIG. 2 is a vertical, cross-sectional view of the melter of FIG. 1.

With reference to the drawings, the present invention of a melter comprises a substantially rectangular metal chamber 10. The chamber 10 is formed with a batch input section 11 which is in communication with the interior of the chamber and extends vertically thereabove. A vertical overflow outlet pipe 12 extends through the bottom of the chamber to a predetermined height. The metal chamber 10, input 11 and pipe 12 are all formed of an alloy which is a basically high temperature chrome, nickel, iron alloy such as produced by Union Carbide Corporation under their trade name "Hastelloy X."

Intermediate the length of the chamber 10, there is provided a baffle 13, also formed of an alloy metal, with the baffle being joined to the top of the chamber, extending across the full width of the chamber 10 and extending downwardly to a point approximately three-fourths the distance to the bottom. The baffle serves to divide the melter into what are termed a melter area and refiner, preventing unmelted batch from reaching the overflow outlet positioned in the refiner section of the melter.

The top, bottom and sidewalls of the chamber 10 are covered by a ceramic muffle 14 having a plurality of elongated notches 15 formed therein. The notches, as best shown in FIG. 2, are open toward the metal surfaces which they surround. Within each of the notches there is positioned a Kanthal heating element 16, it being understood that the heating elements are of the electrical-resistance type.

The ceramic muffle and the ends of the metal chamber 10 are covered by an insulating firebrick 17, with the insulating firebrick in turn substantially enclosed by a super duty firebrick 18.

The bottom, side and end walls of the insulated structure are enclosed by Transite sheathing 19. Thus it can be seen that a totally enclosed metal melter is formed and the vertical corners of the melter are reinforced by angle irons 20, with the corner angle irons 20 being spanned at the upper and lower edges of the width and length of the melter by iron straps 21. By providing the angle irons 20 and straps 21, the melter as a unit is confined with the Transite serving to maintain the integrity of the unit for portability.

As a specific example, a melter was constructed in which the dimensions of the metal chamber were approximately 10 inches × 10 inches × 20 inches. The baffle was positioned 6 inches from the end wall with its lower edge 2 inches from the bottom. The ceramic muffle, which serves as the mounting structure for the electrical-resistance elements was 1¾ inches thick and the two layers of insulating firebrick had a total thickness of 3⅛ inches. The metal, overflow outlet tube 12 was a three-fourths inch tube having one thirty-second inch thickness. The melter of the size described was operated to melt batch at temperatures within the range of 1560° F. to 1600° F. and batch was melted at a rate of 5 pounds per hour.

The apparatus is capable of being moved from one location for feeding molten material to the forehearth to any other desired forehearth location within a glass plant. The apparatus being of metal with insulating brick thereabout, is of considerably less weight than a comparable all ceramic and brick melter. The device is structurally stronger, in that any warpage due to handling of the melter will not cause cracks to form in the glass contacting surfaces of the melter, as is the case in presently used frit melters.

Other and further modifications may be resorted to without departing from the spirit and scope of the appended claims.

We claim:

1. A portable glass melter of the continuous flow-through type, comprising a rectangular metal chamber, said chamber formed of side, bottom and top walls of a refractory metal, refractory insulating means including a ceramic muffle surrounding the walls of said chamber, said muffle formed with a plurality of elongated notches therein opening in the direction of the walls of said chamber, an integral refractory metal batch charging inlet opening through the top wall of said chamber at one end thereof and extending through said insulating means, a refractory metal overflow discharge means at the opposite end of said chamber and extending through said insulating means, baffle means extending downward from the top of said chamber to a point beneath the molten glass level in said chamber, said baffle extending the full width of said chamber and dividing the chamber into a melting zone and refining zone, heating means positioned within the notches of said muffle and substantially surrounding all of the walls of said chamber for melting batch in said chamber, a substantially rigid layer of insulating board covering the external surface of said insulated melter and rigid metal members extending along the edges of said melter for confining the melter as a portable unit.

2. The melter of claim 1, wherein said overflow discharge means comprises a vertical tube extending through the bottom of the melter to a predetermined position below the top thereof.

3. The melter of claim 1, wherein said heating means comprises a plurality of electrical resistance elements positioned about said chamber and mounted within the notches in said muffle.